US007641556B2

(12) United States Patent
Tedsen et al.

(10) Patent No.: US 7,641,556 B2
(45) Date of Patent: Jan. 5, 2010

(54) SHOCK PREVENTION DEVICE AND SYSTEM FOR DISPLAY

(75) Inventors: Kirk A. Tedsen, Reno, NV (US); Kehl T. LeSourd, Reno, NV (US); Jeffrey F. Macedo, Sparks, NV (US)

(73) Assignee: IGT, Reno, NV (US)

( * ) Notice: Subject to any disclaimer, the term of this patent is extended or adjusted under 35 U.S.C. 154(b) by 426 days.

(21) Appl. No.: 11/595,553

(22) Filed: Nov. 10, 2006

(65) Prior Publication Data

US 2008/0113819 A1 May 15, 2008

(51) Int. Cl.
*A63F 13/08* (2006.01)
*A63F 13/00* (2006.01)

(52) U.S. Cl. ....................... 463/46; 463/20; 273/143 R; 273/138.2

(58) Field of Classification Search .................. 463/46, 463/20; 273/143 R, 138.2
See application file for complete search history.

(56) References Cited

U.S. PATENT DOCUMENTS 3,749,982 A * 7/1973 Derdzinski et al. .......... 361/616
5,714,941 A * 2/1998 Gandre ....................... 340/671
6,135,884 A * 10/2000 Hedrick et al. ................ 463/20
6,164,645 A 12/2000 Weiss
6,475,087 B1 11/2002 Cole
2004/0018870 A1* 1/2004 Cole ........................... 463/20
2006/0012184 A1 1/2006 Ottesen et al.

OTHER PUBLICATIONS

International Search Report and Written Opinion Of The International Searching Authority dated Apr. 16, 2008, for related PCT Application No. PCT/US2007/083969.

* cited by examiner

*Primary Examiner*—Benjamin H Layno
(74) *Attorney, Agent, or Firm*—Weaver Austin Villeneuve & Sampson LLP

(57) ABSTRACT

A gaming machine shock prevention device having a door hingedly coupled to a cabinet of the gaming machine, a gaming machine display positioned between the cabinet and the door, the gaming machine display hingedly coupled to the cabinet, and at least one spring, a first end of the spring coupled to the gaming machine display and a second end of the spring coupled to a cabinet interior, wherein the gaming machine display and door are moveable between a first position which defines the cabinet interior and a second position which exposes the cabinet interior, wherein compression of the at least one spring reduces shock to the gaming machine display when moved to the first position, and wherein opening the door to the second position releases the at least one spring to move the gaming machine display to the second position.

27 Claims, 5 Drawing Sheets

SHOCK PREVENTION DEVICE AND SYSTEM FOR DISPLAY

FIELD OF THE INVENTION

The present invention relates to gaming machine displays. More specifically, the present invention relates to a shock prevention device and system for gaming machine displays.

BACKGROUND OF THE INVENTION

Current gaming machine devices comprise a cabinet including a display for displaying information. The display may be a cathode ray tube (CRT) or a liquid crystal display (LCD). A control in the form of hardware and/or software is provided for playing a game of chance or a wager based game, including displaying the information on the display. For example, in a video poker game, the control causes cards to be displayed on the screen, along with other game play information such as bet information.

The displays are generally mounted to the gaming machine door that is generally very large and heavy. Opening the gaming machine door allows access to the internal areas of the gaming machine cabinet, but is problematic when the gaming machine door is closed. When the gaming machine door is closed, it is typically slammed closed to overcome the latch mechanism on the machine that secures the gaming machine door to the cabinet. Unfortunately, the slamming of the gaming machine door creates a shock load on the display that damages the sensitive, necessary, and expensive display. This results in down time for the gaming machine as well as added costs to replace and maintain the display.

BRIEF DESCRIPTION OF THE INVENTION

The invention provides for a device and system to prevent shock and damage to a gaming machine display. The gaming machine shock prevention device comprises a door hingedly coupled to a cabinet of the gaming machine, a gaming machine display positioned between the cabinet and the door, the gaming machine display hingedly coupled to the cabinet, and at least one spring, a first end of the spring coupled to the gaming machine display and a second end of the spring coupled to a cabinet interior, wherein the gaming machine display and door are moveable between a first position which defines the cabinet interior and a second position which exposes the cabinet interior, wherein compression of the at least one spring reduces shock to the gaming machine display when moved to the first position, and wherein opening the door to the second position releases the at least one spring to move the gaming machine display to the second position.

In another embodiment, the gaming machine display shock prevention device comprises a cabinet, a door hingedly coupled to the cabinet, a gaming machine display positioned between the cabinet and the door, the gaming machine display hingedly coupled to the cabinet, and at least one linear actuator having a first end and a second end and having a motor at the first end coupled to an interior of the cabinet, a connector at the second end, the connector coupled to the motor at a first part and to the gaming machine display at a second part, and an activation switch coupled to the motor to activate the motor. The gaming machine display and door are moveable between a first position which defines a cabinet interior and a second position which exposes the cabinet interior, the cabinet interior comprising at least one of a bill validator, a master gaming controller or a printer. Additionally, the activation switch is activated to move the gaming machine display to the second position when the door is moved to the second position.

In yet another embodiment, the gaming machine shock prevention device comprises a cabinet, a door removably connected to the cabinet, a display positioned between the cabinet and the door, the display coupled to the cabinet to display a game of chance, and at least one display motion dampener, a first end of the display motion dampener coupled to the display and a second end of the display motion dampener coupled to a cabinet interior, wherein the display and door are moveable between a first position which defines an interior of the gaming machine and a second position which exposes the cabinet interior, wherein the display motion dampener reduces shock to the display when moved to the first position, and wherein the display is not mounted to the door.

BRIEF DESCRIPTION OF THE DRAWINGS

The accompanying drawings, which are incorporated into and constitute a part of this specification, illustrate one or more embodiments and, together with the detailed description, serve to explain the principles and implementations of the invention.

In the drawings.

DETAILED DESCRIPTION

Embodiments are described herein in the context of shock prevention device and system for display. Those of ordinary skill in the art will realize that the following detailed description is illustrative only and is not intended to be in any way limiting. Other embodiments will readily suggest themselves to such skilled persons having the benefit of this disclosure. Reference will now be made in detail to implementations as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The invention provides for a device to prevent shock and damage to a gaming machine display by dampening the motion of the display. The shock from the motion of the display may be dampened by slowing the rotation of the gaming machine door when it is being closed and engages the latch mechanism that removably secures the gaming machine door to the cabinet. This may increase the life of the display and results in less maintenance, service, replacement of the display and less downtime of the gaming machine.

Figure 1:
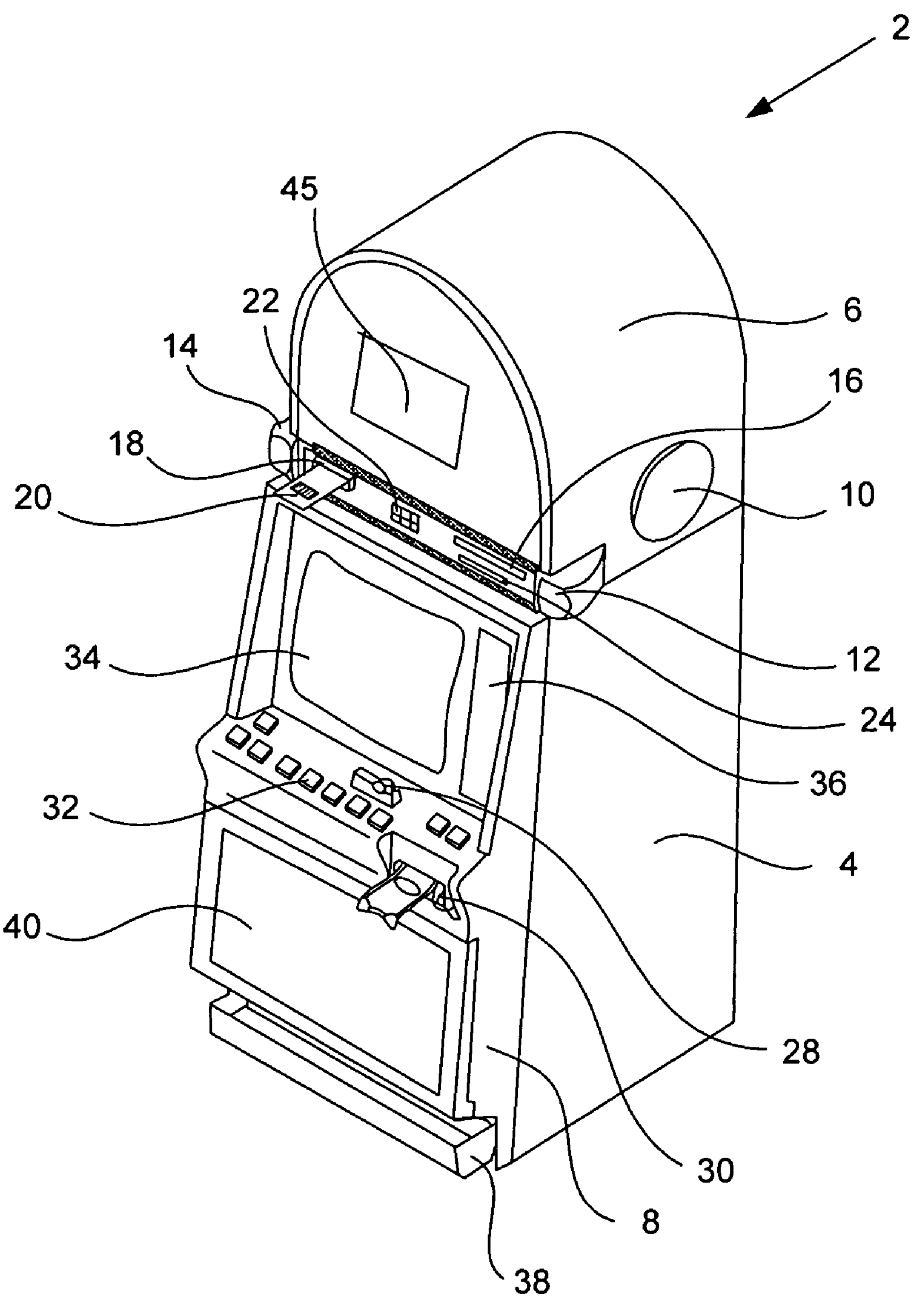
FIG. 1 illustrates an embodiment of a gaming machine.

FIG. 1 illustrates an embodiment of a gaming machine. Gaming machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. Although illustrated as attached to the main door, the player-input switches or buttons 32 may also be attached to the gaming machine cabinet itself and not to the main door. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of pay lines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 45. The ticket printer 18 may be used to print tickets for a cashless ticketing system. Further, the top box 6 may house different or additional devices than shown in FIG. 1. For example, the top box may contain a bonus wheel or a back-lit silk screened panel that may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

When a user wishes to play the gaming machine 2, he or she inserts cash through the coin acceptor 28 or bill validator 30. Additionally, the bill validator may accept a printed ticket voucher that may be accepted by the bill validator 30 as indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 45 located in the top box.

During the course of a game, a player may be required to make a number of decisions, which affect the outcome of the game. For example, a player may vary his or her wager on a particular game, select a prize for a particular game selected from a prize server, or make game decisions that affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input device.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40.

After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 2A:
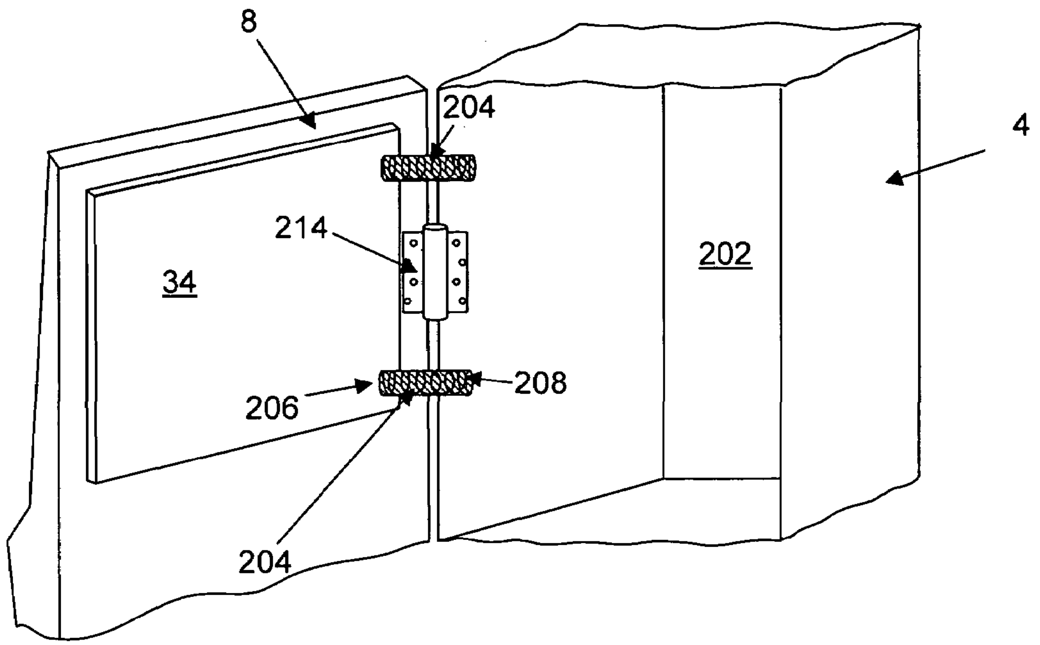
FIGS. 2A, 2B, and 2C illustrate one embodiment of a motion display dampener for a gaming machine.
Figure 2B:
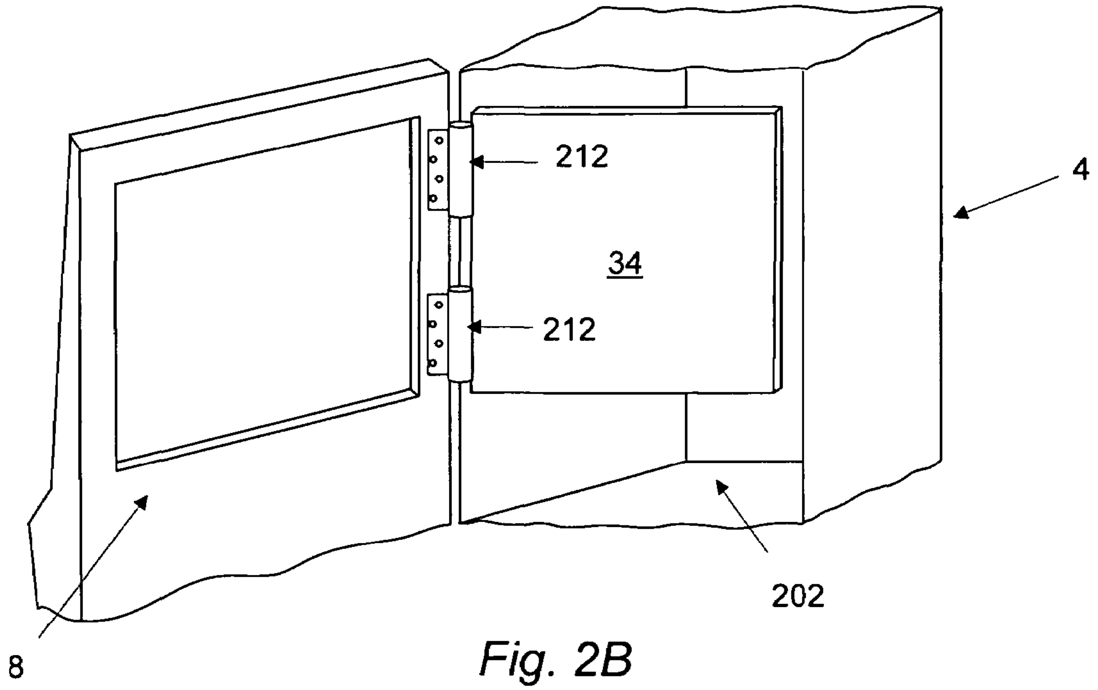
Figure 2C:
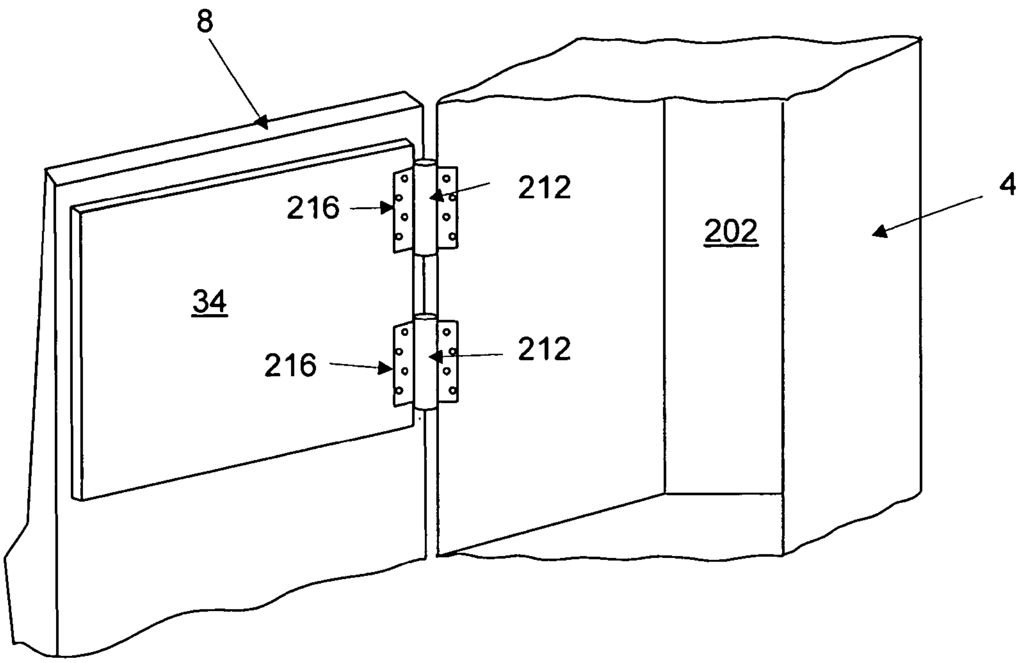

FIGS. 2A, 2B, and 2C illustrate one embodiment of a motion display dampener for a gaming machine. Although illustrated in use with the display 34 on the main cabinet 4, the display motion dampener may be used with other displays such as the video display screen 45 on the top box 6. The main door 8 may be hingedly coupled to the cabinet 4 through any means that will allow the main door 8 to move between a first or closed position that defines the cabinet interior and a second or open position that exposes the cabinet interior 202 as illustrated in FIGS. 2A-C. For exemplary purposes only and not intended to be limiting, any known hinge may be used to couple the main door 34 to the cabinet 4.

The display 34 may be positioned between the cabinet 4 and the main door 8. In one embodiment, the display 34 may be coupled to the cabinet 4 and not the main door 8 as illustrated in FIGS. 2A-C. Alternatively, the display 34 may be coupled to the main door 8 and not the cabinet 4. The display 34 may coupled to the cabinet 4 or the main door 8 though any means that will allow the display 34 to be moveable between a first or closed position (FIG. 2B) that defines the cabinet interior and a second or open position (FIG. 2A, 2C) that exposes the cabinet interior 202. For exemplary purposes only and not intended to be limiting, any known hinge 210 may be used to couple the display 34 to the cabinet 4. Although FIG. 2A is illustrated with the use of one hinge 210, the number is not intended to be limiting as any number of hinges may be used as necessary to connect the display 34 to the cabinet interior 202.

The display motion dampener may have at least one spring 204. Although illustrated with two springs in FIG. 2A, the number is not intended to be limiting as any numbers of springs may be used. A first end 206 of the spring 204 may be coupled to the display 34 and a second end 206 of the spring 204 may be coupled to the cabinet interior 202. In use, when the display 34 is moved to the closed position, any shock from closing the main door 8 and display 34 is transferred to the compression of the spring 204 thereby reducing shock and preventing damage to the display 34. Additionally, when the main door 8 is opened, release of the spring 204 may assist the technician in moving the main door 8 and display 34 to an open position.

Figure 3A:
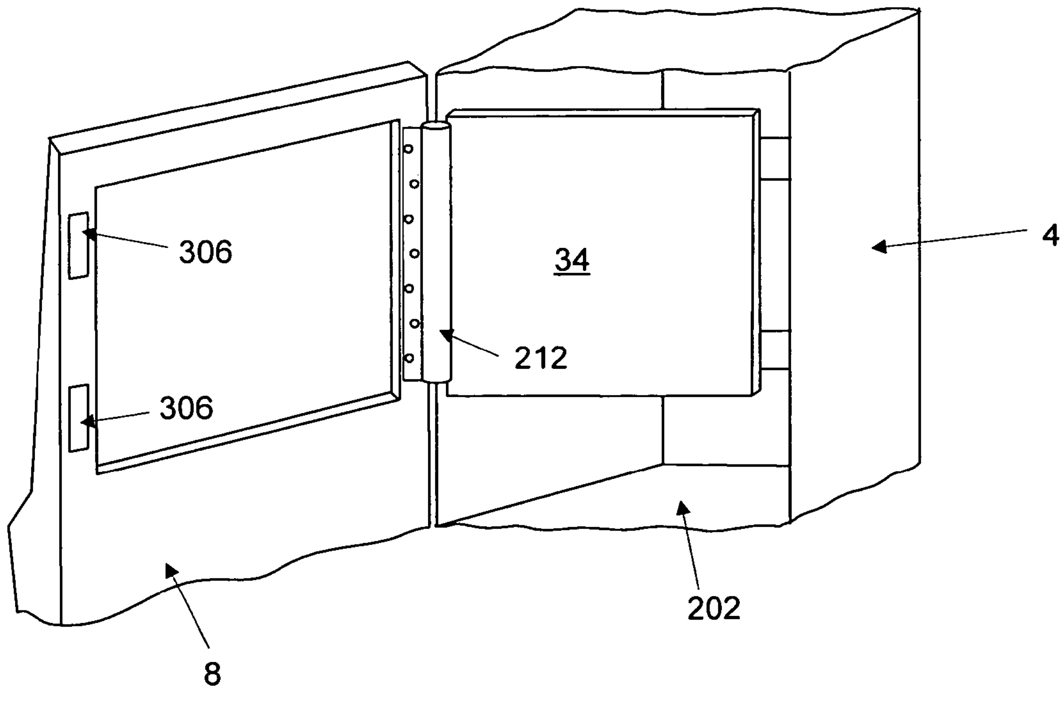
FIGS. 3A, 3B, and 3C illustrate another embodiment of a motion display dampener for a gaming machine.
Figure 3B:
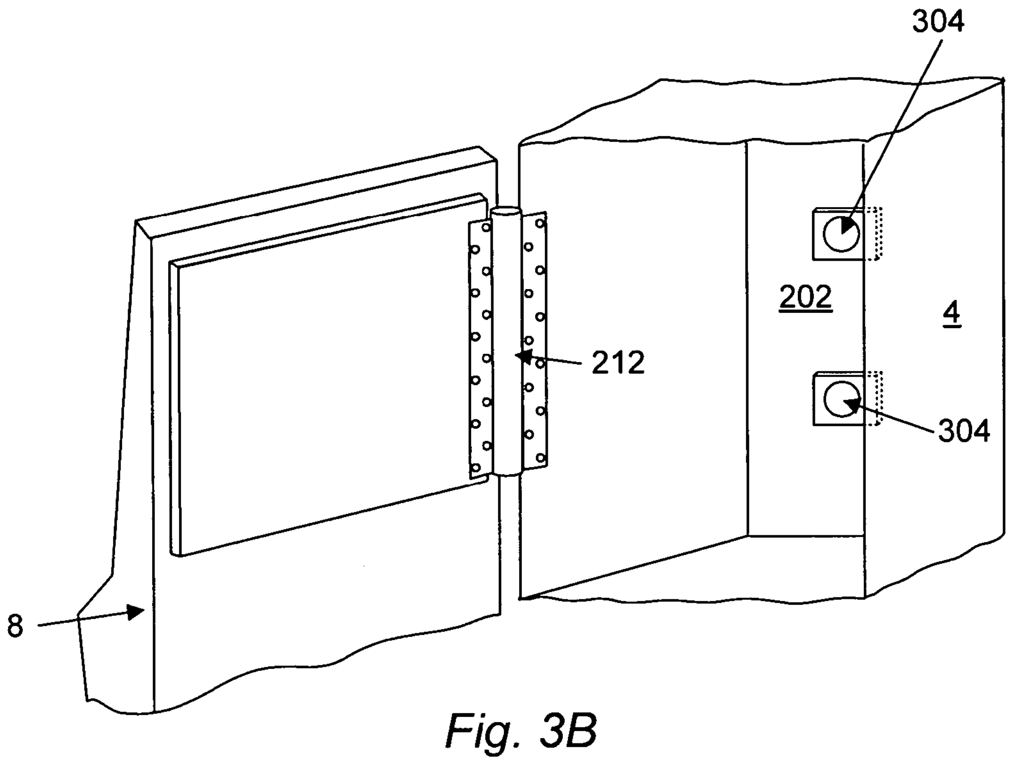

In another embodiment, illustrated in FIGS. 2B-2C, the spring may be a component of a hinge 212 such as a torsion hinge. Although illustrated with the use of two torsion hinges 212, the number is not limiting as any number of torsion hinge may be used such as a single torsion hinge 212 as illustrated in FIGS. 3A and 3B. Moreover, the torsion hinge 212 may be used to only couple the display 34 to the cabinet 4. As such, a separate hinge 302, as illustrated in FIG. 3C, may be used to couple to main door 8 to the cabinet 4.

Alternatively, a single torsion hinge 212 may be used to couple both the display 34 and the door 8 to the cabinet 4. The torsion hinge 212 may have a first section 214 to couple the main door 8 to the cabinet 4 and a second section 216 to couple the display 34 to the cabinet 4. In this embodiment, the display 34 is separate from the main door 8. As such, a single torsion hinge 212 may be used to connect both the display 34 and the main door 8 to the cabinet 4 without being connected together. In use, when the display 34 is moved to the closed position, any shock from closing the main door 8 is transferred to the compression of the spring in the torsion hinge 212 thereby reducing shock and preventing damage to the display 34. Additionally, when the main door 8 is opened, release of the torsion hinge 212 may assist the technician in moving the main door 8 and display 34 to an open position.

Figure 3C:
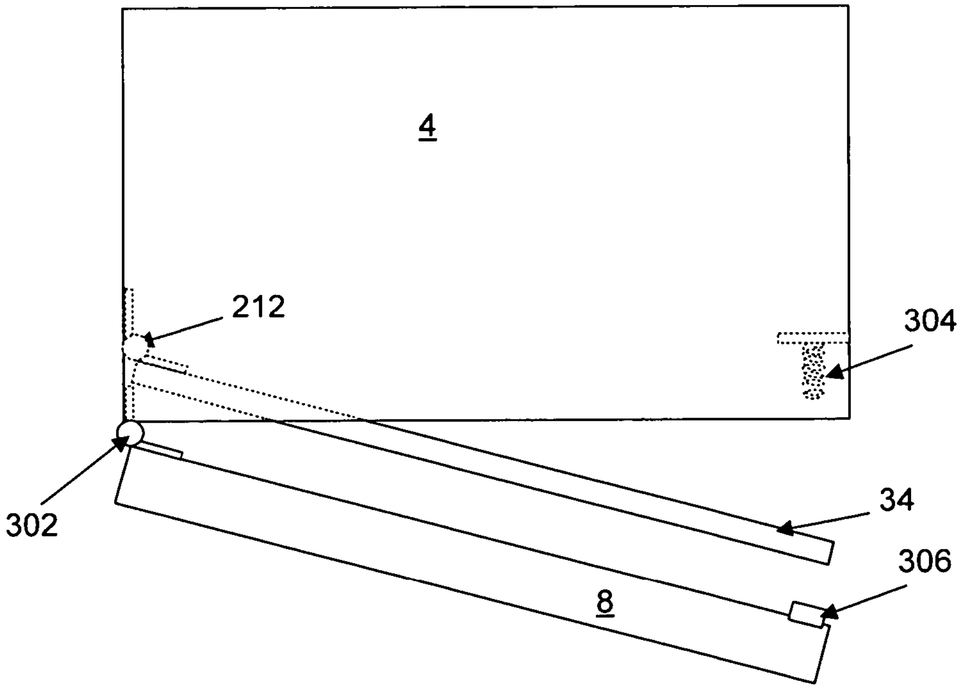

FIGS. 3A, 3B, and 3C illustrate another embodiment of a motion display dampener for a gaming machine. FIGS. 3A and 3B illustrate a side view of the motion display dampener and FIG. 3C illustrates a top view of the motion display dampener. The motion display dampener may have a spring 304 coupled to the cabinet interior 202 and a magnet 306 coupled to the main door 8. The spring 304 may be any known spring and the magnet 306 may be any known magnet including an electromagnet. Some displays 34 may be sensitive to electromagnetic forces. As such, a cover (not shown) may be placed over the magnet to shield and protect the display 34. Although illustrated with the use of two springs 304 and two magnets 306, the numbers are not intended to be limiting as any number of springs and magnets may be used. Additionally, although illustrated coupled to the main door 8, the magnets 306 may be coupled to the outer surface of the display 34.

In use, when the main door 8 is opened, as illustrated in FIG. 3B, the magnet force from the magnet 306 releasably secures the display 34 to the door 8 such that both are opened together. Additionally, contraction or release of the spring 304 may assist in moving the display 34 to an open position. When the display 34 is moved to the closed position, any shock from closing the main door 8 is transferred to the compression of the spring 304 thereby reducing shock and preventing damage to the display 34. Additionally, the magnets 306 may secure the display 34 to the main door 8 as the main door 8 is closed.

Figure 4:
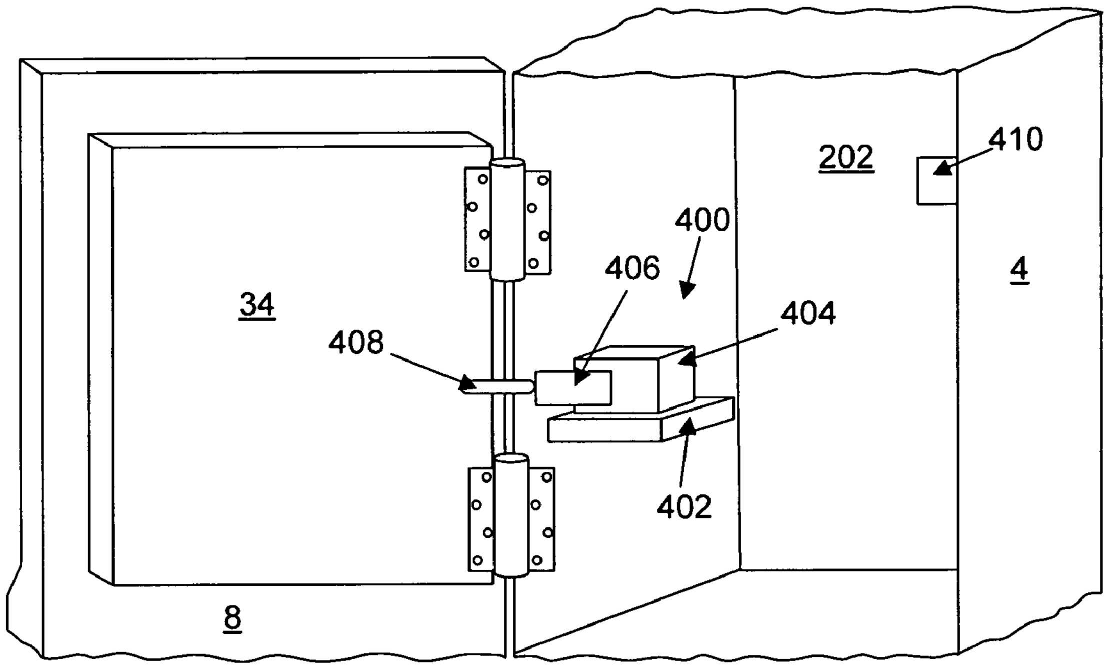
FIG. 4 illustrates yet another embodiment of a motion dampener for a gaming machine display.

FIG. 4 illustrates yet another embodiment of a motion dampener for a gaming machine display. The motion dampener may be a linear actuator, generally numbered 400. The linear actuator 400 may be coupled to the cabinet interior 202 in any manner, such as with the use of a shelf 402. The linear actuator may have a motor 404 and a connector 406 coupled to the display 34. The connector 406 may further comprise a rotatable piston 408. To move the display to an open or closed position, the connector should be configured to rotate about a horizontal axis.

An activation switch 410 may be in communication with the motor 404 to activate or deactivate the motor 404. In one embodiment, the switch may be activated when the main door 8 is opened to initiate the motor and move the display 34 in an open position. When closing the main door 8 and display 34, the a linear actuator 400 prevents shock to the display 34 by controlling the amount of force used to move the display in the closed position.

While embodiments and applications have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A gaming machine shock prevention device, comprising:

a door hingedly coupled to a cabinet of the gaming machine;

a gaming machine display positioned between the cabinet and the door, the gaming machine display hingedly coupled to the cabinet;

wherein an axis of rotation of the door's coupling to the cabinet is parallel to an axis of rotation of the display's coupling to the cabinet; and at least one spring, a first end of the spring coupled to the gaming machine display and a second end of the spring coupled to a cabinet interior;

wherein the gaming machine display and door are moveable between a first position which defines the cabinet interior and a second position which exposes the cabinet interior;

wherein the at least one spring is configured to be in compression and to reduce shock to the gaming machine display when the display is moved to the first position; and wherein the at least one spring is configured to generate an expansion force to push against the display when the door is moved toward the second position, thereby assisting in moving the display to the second position.

2. The gaming machine of claim 1, wherein the gaming machine display is removably mounted to the door.

3. The gaming machine of claim 1, wherein the at least one spring is a component of a torsion hinge.

4. The gaming machine of claim 3, wherein the torsion hinge further comprises:

a first section coupled to the gaming machine display to move the gaming machine display in the first and second position; and a second section coupled to the door to move the door in the first and second position.

5. The gaming machine of claim 1, further comprising:

a magnet adapted to apply a magnetic force to releasably secure the gaming machine display to the door when the door is moved to the second position.

6. The gaming machine of claim 5, wherein the magnet further comprises a cover to shield the gaming machine display from electromagnetic forces.

7. The gaming machine of claim 5, wherein the magnet is coupled to an inner surface of the door.

8. The gaming machine of claim 5, wherein the magnet is coupled to an outer surface of the gaming machine display.

9. The gaming machine of claim 5, wherein the magnet comprises an electromagnet.

10. A gaming machine display shock prevention device, comprising:

a cabinet;

a door hingedly coupled to the cabinet;

a gaming machine display positioned between the cabinet and the door, the gaming machine display hingedly coupled to the cabinet;

wherein an axis of rotation of the door's coupling to the cabinet is parallel to an axis of rotation of the display's coupling to the cabinet; and at least one linear actuator having a first end and a second end, including:

a motor at the first end coupled to an interior of the cabinet;

a connector at the second end, the connector coupled to the motor at a first part and to the gaming machine display at a second part; and an activation switch coupled to the motor to activate the motor;

wherein the gaming machine display and door are moveable between a first position which defines a cabinet interior and a second position which exposes the cabinet interior, the cabinet interior including at least one of a bill validator, a master gaming controller or a printer; and wherein the activation switch is configured to cause the gaming machine display to move to the second position when the door is moved toward the second position.

11. The gaming machine of claim 10, wherein the gaming machine display is removably mounted to the door.

12. The gaming machine of claim 10, wherein the connector comprises a piston.

13. The gaming machine of claim 10, wherein the activation switch is also configured to operate the motor to move the gaming machine display to the first position to prevent shock to the gaming machine display.

14. The gaming machine of claim 10, wherein the connector is configured to rotate about a horizontal axis as the display is moved to the first or second position.

15. A gaming machine shock prevention device, comprising:

a cabinet;

a door removably connected to the cabinet;

a display positioned between the cabinet and the door, the display coupled to the cabinet to display a game of chance; and at least one display motion dampener, a first end of the display motion dampener coupled to the display and a second end of the display motion dampener coupled to a cabinet interior;

wherein the display and door are moveable between a first position which defines an interior of the gaming machine and a second position which exposes the cabinet interior;

wherein the display motion dampener is configured to reduce shock to the display when the display is moved to the first position; and wherein the display motion dampener further includes a linear actuator comprising:

a motor at the second end, the motor coupled to an interior of the cabinet;

a connector at the first end, the connector coupled to the motor at a first part and to the gaming machine display at a second part; and an activation switch coupled to the motor to activate the motor;

wherein the activation switch is configured to operate the motor to move the display to the second position when the door is opened toward the second position.

16. The gaming machine of claim 15, wherein the display is removably mounted to the door.

17. The gaming machine of claim 15, wherein the at least one display motion dampener further comprises:

at least one spring;

wherein the at least one spring is configured to be in compression and to reduce shock to the display when the display is moved to the first position; and wherein the at least one spring is configured to generate an expansion force to push against the display when the door is moved toward the second position, thereby assisting in moving the display to the second position.

18. The gaming machine of claim l7, wherein the spring is a component of a torsion hinge.

19. The gaming machine of claim 18, wherein the torsion hinge further comprises:

a first section coupled to the display to move the display in the first and second position; and a second section coupled to the door to move the door in the first and second position.

20. The gaming machine of claim 17, wherein the at least one display motion dampener further comprises:

a magnet adapted to apply a magnetic force to releasably secure the display to the door when the door is moved to the second position.

21. The gaming machine of claim 20, wherein the magnet further comprises a cover to shield the display from electromagnetic forces.

22. The gaming machine of claim 20, wherein the magnet is coupled to an inner surface of the door.

23. The gaming machine of claim 20, wherein the magnet is coupled to an outer surface of the display.

24. The gaming machine of claim 20, wherein the magnet further comprises an electromagnet.

25. The gaming machine of claim 15, wherein the activation switch is configured to engage the motor to move the display to the first position to prevent shock to the display.

26. The gaming machine of claim 15, wherein the connector is a piston.

27. The gaming machine of claim 15, wherein the connector is configured to rotate about a horizontal axis as the display is moved to the first or second position.

* * * * *

UNITED STATES PATENT AND TRADEMARK OFFICE

CERTIFICATE OF CORRECTION

PATENT NO. : 7,641,556 B2
APPLICATION NO. : 11/595553
DATED : January 5, 2010
INVENTOR(S) : Tedsen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 482 days.

Signed and Sealed this

Sixteenth Day of November, 2010

David J. Kappos

David J. Kappos
*Director of the United States Patent and Trademark Office*